United States Patent
Pesek

(10) Patent No.: US 7,546,850 B1
(45) Date of Patent: Jun. 16, 2009

(54) CONTROLLED ACCESS VENT FOR WATER STORAGE UNIT

(75) Inventor: Donald J. Pesek, Fargo, ND (US)

(73) Assignee: Pre-Vent Industries, LLC, Fargo, ND (US)

( * ) Notice: Subject to any disclaimer, the term of this patent is extended or adjusted under 35 U.S.C. 154(b) by 590 days.

(21) Appl. No.: 11/143,055

(22) Filed: Jun. 2, 2005

(51) Int. Cl.
*F16K 24/00* (2006.01)

(52) U.S. Cl. .................. 137/587; 137/591; 220/745

(58) Field of Classification Search .......... 137/587, 137/588, 591, 589, 583, 205, 372, 376, 592; 220/748, 747, 745
See application file for complete search history.

(56) References Cited

U.S. PATENT DOCUMENTS

| | | | | |
|---|---|---|---|---|
| 249,918 A | * | 11/1881 | Forster | 220/745 |
| 1,643,924 A | * | 9/1927 | Clark | 220/748 |
| 2,065,429 A | * | 12/1936 | Clapp | 62/259.1 |
| 3,123,249 A | * | 3/1964 | Gorand et al. | 220/745 |
| 4,924,897 A | * | 5/1990 | Brown | 137/1 |
| 5,236,100 A | * | 8/1993 | Shin | 220/89.1 |
| 6,575,826 B2 | | 6/2003 | Myint | 454/276 |

* cited by examiner

*Primary Examiner*—Stephen M Hepperle
*Assistant Examiner*—Andrew J Rost
(74) *Attorney, Agent, or Firm*—Marsh Fischmann & Breyfogle LLP

(57) ABSTRACT

A vented water storage system (16) is disclosed. A vent (62) is disposed within an elbow (38). A riser pipe (26) extends from the elbow (38) to a containment (18) having water (22) stored therein. The vent (62) includes an open end (66) that fluidly communicates with the riser pipe (26), and a closed end (70) that is located between a distally located open end (42) of the elbow (38) and the open end (66) of the vent (62). An access port (74) is included on a sidewall (64) of the vent (62) at a location within the elbow (38) that reduces the potential for being able to introduce a liquid into the open end (42) of the elbow (38) in a manner such that this liquid will reach the containment (18).

30 Claims, 3 Drawing Sheets

CONTROLLED ACCESS VENT FOR WATER STORAGE UNIT

FIELD OF THE INVENTION

The present invention generally relates to the field of vented water storage systems and, more particularly, to reducing the potential for being able to introduce a liquid into a containment of stored water through the vent.

BACKGROUND OF THE INVENTION

Water is commonly stored above ground or underground in an appropriate containment structure or the like as a reserve for use during times of peak water usage. A water treatment plant may be fluidly interconnected with the containment structure to treat the water prior to storage and/or to treat the water after been retrieved from storage for subsequent use. In any case, water may be withdrawn from this containment structure and thereafter used for any appropriate purpose. Typically these types of containment structures are vented above ground. As such, it may be possible to introduce a hazardous substance into the containment structure through the above-ground vent, which of course would be undesirable.

BRIEF SUMMARY OF THE INVENTION

A first aspect of the present invention is embodied by a water storage system that includes a containment having a quantity of water stored therein. A venting conduit extends from the containment and includes a first end section, that in turn includes a first open end. A vent is disposed within the venting conduit and is fluidly interconnected with the containment. A certain relationship exists between the vent and the first end section of the venting conduit. More specifically, the first end section of the venting conduit may be characterized as including an upper wall, a lower wall, and a pair of sidewalls that are spaced from each other and that each extend between and interconnect the upper and lower walls. The lower wall includes an apex that is disposed at a higher elevation than the first open end of the first end section of the venting conduit. The vent includes an access port that is entirely disposed at a higher elevation than this apex of the lower wall.

Various refinements exist of the features noted in relation to the first aspect of the present invention. Further features may also be incorporated in the first aspect of the present invention as well. These refinements and additional features may exist individually or in any combination. The containment may be of any appropriate size, shape, and configuration, and may be formed from any appropriate material or combination of materials. In one embodiment, the containment is located entirely underground and/or both the first open end of the venting conduit and the vent are located above ground. However, the containment could also be located entirely above ground, or partially above ground and partially below ground. In any case, the water storage system may be part of what may be characterized as a water supply system, where a water treatment facility or the like would be fluidly interconnected with the containment to treat water for storage within the containment. It should be appreciated that this first aspect may be applicable for storing liquids other than water.

The first open end of the venting conduit may be of any configuration that allows a flow therethrough. It may be desirable to incorporate a screen or the like at the first open end.

There are a number of general notables in relation to the venting conduit and/or the vent. One is that all fluid communication (whether a liquid and/or gas) between the first open end of the venting conduit and the containment should be directed through the vent, regardless of the direction of the flow through the venting conduit. Another is that it would be preferable for there to be a constantly open flow path between the containment and the first open end of the venting conduit. In one embodiment, the vent is configured/oriented so as to reduce the potential of being able to introduce a liquid into the containment by directing this liquid through the first open end of the venting conduit. In a first vent configuration, one end of the vent is open, one end of the vent is closed, a sidewall extends between these two ends and includes the access port for accessing the interior of the vent, and the vent is oriented within the venting conduit such that its closed end is located between the first open end of the venting conduit and the open end of the vent. Therefore, a flow out of the containment would pass through the venting conduit, into the open end of the vent, through the access port of the vent and into the first end section of the venting conduit, and then out the first open end of the venting conduit.

The venting conduit may be of any appropriate size, shape, and configuration, and further may be formed from any appropriate material or combination of materials. Although the venting. conduit could be in the form of a continuous or one-piece structure, the venting conduit would more typically be in the form of a multi-piece structure, where the various pieces could be interconnected (e.g., detachably) to accommodate installation of the vent within one or more of the pieces. In one embodiment, the venting conduit is in the form of a riser pipe and an elbow, where the elbow is the noted first end section of the venting conduit and thereby includes the first open end. The riser pipe and elbow are interconnected by a riser pipe flange that is attached to the riser pipe (integrally or separately attached), and by an elbow flange that is attached to the elbow (integrally or separately attached). One or more intermediate flanges could be utilized. Any way of interconnecting the riser pipe and elbow could be utilized as well. In any case, the first open end of the venting conduit is provided on the end of the elbow that is opposite that which interfaces with and/or is proximate to the elbow flange. A vent flange is attached to the vent (integrally or separately attached) and is disposed somewhere between the elbow flange and the riser pipe flange, and the riser pipe flange, vent flange, and elbow flange are appropriately interconnected. The vent flange thereby obstructs a flow from the elbow directly into the riser pipe. The access port is included on the vent to allow fluid communication (liquid, gas, or a combination thereof) between the first open end of the elbow and the riser pipe in either direction.

The access port of the vent may be of any appropriate size, shape, and/or configuration. Multiple access ports could be utilized as well. Generally, the entirety of each access port to the interior of the vent is preferably positioned within the venting conduit above what may be characterized as the "maximum liquid level" within the first end section of the venting conduit that includes the first open end. Consider the case where a liquid that is introduced into the venting conduit through its first open end must enter the access port of the vent in order to be able to flow into the containment. In one embodiment, this is accomplished by providing a flow obstruction within the venting conduit that may be bypassed by entering the vent through its access port. In any case, the first end section of the venting conduit may be configured such that the liquid will rise to a certain level within the venting conduit before it starts running back out its first open end (the noted "maximum liquid level"). The above-noted "maximum liquid level" would exist for when the liquid is introduced into the venting conduit through its first open end at less than a certain flow rate. By disposing the entirety of each access port of the vent above this maximum liquid level, liquid being introduced into the venting conduit through its first open end in the noted manner should not be able to gain access to the interior of the vent through its access port, and thereby should be precluded from flowing into the containment.

In one embodiment, the first end section of the venting conduit is in the form of an elbow as noted above. This elbow may be oriented such that the first open end projects downwardly. This elbow further may be defined at least in part by an outer or outside radius, as well as an inner or inside radius. The entirety of each access port of the vent may be disposed at a higher elevation than any portion of the elbow that is defined by the noted inner or inside radius, or stated another way disposed at a higher elevation than the entirety of the elbow that is defined by the noted inner or inside radius.

A second aspect of the present invention is embodied by a water storage system that includes a containment having a quantity of water stored therein. A venting conduit extends from the containment and includes a first open end. A flow obstruction exists somewhere within the venting conduit, and that in effect separates the venting conduit into a first section (on a first side of the flow obstruction, and that includes the first open end) and a second section (on a second side of the flow obstruction, and that extends from the flow obstruction to the containment). A vent is disposed within the conduit and bypasses the flow obstruction to establish fluid communication (liquid, gas, or a combination thereof) between the first and second sections of the venting conduit.

Various refinements exist of the features noted in relation to the second aspect of the present invention. Further features may also be incorporated in the second aspect of the present invention as well. These refinements and additional features may exist individually or in any combination. The containment may be of any appropriate size, shape, and configuration, and may be formed from any appropriate material or combination of materials. In one embodiment, the containment is located entirely underground and/or both the first open end of the venting conduit and the vent are located above ground. However, the containment could also be located entirely above ground, or partially above ground and partially below ground. In any case, the water storage system may be part of what may be characterized as a water supply system, where a water treatment facility or the like would be fluidly interconnected with the containment to treat water for storage within the containment. It should be appreciated that the second aspect may be applicable for storing liquids other than water.

The first open end of the venting conduit may be of any configuration that allows a flow therethrough. It may be desirable to incorporate a screen or the like at the first open end. There are a number of general notables in relation to the venting conduit and/or the vent. One is that all fluid communication (whether a liquid and/or gas) between the first open end of the venting conduit and the containment should be directed through the vent, regardless of the direction of the flow through the venting conduit. Another is that is would be preferable for there to be a constantly open flow path between the containment and the first open end of the venting conduit. In one embodiment, the vent is configured/oriented so as to reduce the potential of being able to introduce a liquid into the containment by directing this liquid through the first open end of the first section of the venting conduit. In a first vent configuration, one end of the vent is open, one end of the vent is closed, a sidewall extends between these two ends and includes at least one aperture or access port for accessing the interior of the vent, and the vent is oriented within the venting conduit such that its closed end is located between the first open end of the first section of the venting conduit and the open end of the vent. Therefore, a flow out of the containment would pass through the second section of the venting conduit, into the open end of the vent, through the access port of the vent and into the first section of the venting conduit, and then out the first open end of the first section of the venting conduit.

The venting conduit may be of any appropriate size, shape, and configuration, and may be formed from any appropriate material or combination of materials. Although the venting conduit could be in the form of a continuous or one-piece structure, the venting conduit would more typically be in the form of a multi-piece structure, where the various pieces could be interconnected (e.g., detachably) to accommodate installation of the vent within one or more of the pieces. In one embodiment, the venting conduit is in the form of a riser pipe (second section of the venting conduit) and an elbow (first section of the venting conduit). The riser pipe and elbow are interconnected by a riser pipe flange that is attached to the riser pipe (integrally or separately attached), and by an elbow flange that is attached to the elbow (integrally or separately attached). One or more intermediate flanges could be utilized. Any way of interconnecting the riser pipe and elbow could be utilized as well. In any case, the first open end of the venting conduit is provided on the end of the elbow that is opposite that which interfaces with and/or is proximate to the elbow flange. A vent flange is attached to the vent (integrally or separately attached) and is disposed somewhere between the elbow flange and the riser pipe flange, and the riser pipe flange, vent flange, and elbow flange are appropriately interconnected. The vent flange thereby obstructs a flow from the elbow directly into the riser pipe. One or more access ports may be included on the vent to allow fluid communication (liquid, gas, or a combination thereof) between the first open end of the elbow and the riser pipe in either direction. Each such access port of the vent may be of any appropriate size, shape, and/or configuration.

Generally, one or more access ports to the interior of the vent are each preferably positioned within the venting conduit entirely above what may be characterized as the "maximum liquid level" within the first section of the venting conduit that includes the first open end. Each such access port may be of any appropriate size, shape, and/or configuration. Consider the case where a liquid that is introduced into the first section of the venting conduit through its first open end must enter an access port of the vent in order to be able to flow into the second section of the conduit and then into the containment. The first section of the venting conduit may be configured such that the liquid will rise to a certain level within the first section of the venting conduit before it starts running back out its first open end (the noted "maximum liquid level"). The above-noted "maximum liquid level" would exist for when the liquid is introduced into the first section of the venting conduit through its first open end at less than a certain flow rate. By disposing the entirety of each access port of the vent above this maximum liquid level, liquid being introduced into the first section of the venting conduit through its first open end in the noted manner should not be able to gain access to the interior of the vent through its access port, and thereby should be precluded from flowing into the second section of the venting conduit and ultimately into the containment.

A number of characterizations may be made in relation to the first section of the venting conduit, each of which is in accordance with the second aspect. In a first embodiment of the second aspect, the above-noted first section of the venting conduit includes an upper wall, a lower wall, and a pair of sidewalls that are spaced from each other and that each extend between and interconnect the upper and lower walls. The lower wall includes an apex that is disposed at a higher elevation than the first open end of the first section of the venting conduit. The vent includes an access port that is entirely disposed at a higher elevation than this apex of the lower wall.

In a second embodiment of the second aspect, an apex of a flow path through the above-noted first section of the venting conduit is disposed at a higher elevation than the first open end of the first end section of the venting conduit. The vent includes an access port that is entirely disposed at a higher elevation than a lower boundary of the first section of the venting conduit at the location of this flow path apex.

In a third embodiment of the second aspect, the first section of the venting conduit is in the form of an elbow. This elbow is oriented such that the first open end projects downwardly. The elbow is defined at least in part by an outer or outside radius, as well as an inner or inside radius. The vent includes an access port that is entirely disposed at a higher elevation than the entirety of the elbow that is defined by the noted inner or inside radius.

In a fourth embodiment of the second aspect, the first section of the venting conduit includes an interior surface, which in turn includes a first convex section. The vent includes an access port that is entirely disposed at a higher elevation than this first convex section.

In each of the noted first, second, third, and fourth embodiments of the second aspect, liquid that is introduced into the venting conduit through its first open end should start flowing back out of this first open end before the liquid level within the first section of the venting conduit can rise to the level of any access port of the vent. If any of this liquid were to rise to the same or a higher level than any access port of the vent, this liquid could then enter the vent and ultimately the containment. Therefore, it would then be proper to characterize the vent of the first through the fourth embodiments of the second aspect as an anti-tampering device. It should be appreciated that the above-noted first vent configuration could be used by each of the first through the fourth embodiments of the second aspect as well.

A third aspect of the present invention is embodied by a water storage system that includes a containment having a quantity of water stored therein. A venting conduit extends from the containment and includes a first end section, that in turn includes a first open end. A vent is disposed within the venting conduit and is fluidly interconnected with the containment. One end of the vent is open, one end of the vent is closed, and a sidewall extends between these two ends of the vent. At least one aperture or access port for accessing the interior of the vent is included on the sidewall of the vent. The vent is oriented relative to the venting conduit such that its closed end is located between the first open end of the first end section of the venting conduit and the open end of the vent.

Various refinements exist of the features noted in relation to the third aspect of the present invention. Further features may also be incorporated in the third aspect of the present invention as well. These refinements and additional features may exist individually or in any combination. The containment may be of any appropriate size, shape, and configuration, and may be formed from any appropriate material or combination of materials. In one embodiment, the containment is located entirely underground and/or both the first open end of the venting conduit and the vent are located above ground. However, the containment could also be located entirely above ground, or partially above ground and partially below ground. In any case, the water storage system may be part of what may be characterized as a water supply system, where a water treatment facility or the like would be fluidly interconnected with the containment to treat water for storage within the containment. It should be appreciated that this third aspect may be applicable for storing liquids other than water.

The first open end of the venting conduit may be of any configuration that allows a flow therethrough. It may be desirable to incorporate a screen or the like at the first open end. There are a number of general notables in relation to the venting conduit and/or the vent. One is that all fluid communication, (whether a liquid and/or gas) between the first open end of the venting conduit and the containment should be directed through the vent, regardless of the direction of the flow through the venting conduit. Another is that is would be preferable for there to be a constantly open flow path between the containment and the first open end of the venting conduit. In one embodiment, the vent is configured/oriented so as to reduce the potential of being able to introduce a liquid into the containment by directing this liquid through the first open end of the venting conduit. In one embodiment, a flow out of the containment would pass through the venting conduit, into the open end of the vent, through the access port of the vent and into the first end section of the venting conduit, and then out the first open end of the venting conduit.

The venting conduit may be of any appropriate size, shape, and configuration, and further may be formed from any appropriate material or combination of materials. Although the venting conduit could be in the form of a continuous or one-piece structure, the venting conduit would more typically be in the form of a multi-piece structure, where the various pieces could be interconnected (e.g., detachably) to accommodate installation of the vent within one or more of the pieces. In one embodiment, the venting conduit is in the form of a riser pipe and an elbow, where the elbow is the noted first end section of the venting conduit and thereby includes the first open end. The riser pipe and elbow are interconnected by a riser pipe flange that is attached to the riser pipe (integrally or separately attached), and by an elbow flange that is attached the elbow (integrally or separately attached). One or more intermediate flanges could be utilized. Any way of interconnecting the riser pipe and elbow could be utilized as well. In any case, the first open end of the venting conduit is provided on the end of the elbow that is opposite that which interfaces with and/or is proximate to the elbow flange. A vent flange is attached to the vent (integrally or separately attached) and is disposed somewhere between the elbow flange and the riser pipe flange, and the riser pipe flange, vent flange, and elbow flange are appropriately interconnected. The vent flange thereby obstructs a flow from the elbow directly into the riser pipe. The access port is included on the vent to allow fluid communication (liquid, gas, or a combination thereof) between the first open end of the elbow and the riser pipe in either direction.

Generally, one or more access ports to the interior of the vent are each preferably positioned within the venting conduit entirely above what may be characterized as the "maximum liquid level" within the first end section of the venting conduit that includes the first open end. Each such access port may be of any appropriate size, shape, and/or configuration. Consider the case where a liquid that is introduced into the first end section of the venting conduit through its first open end must enter an access port of the vent in order to be able to flow into the containment. The first end section of the venting conduit may be configured such that the liquid will rise to a certain level within the first end section of the venting conduit before it starts running back out its first open end (the noted "maximum liquid level"). The above-noted "maximum liquid level" would exist for when the liquid is introduced into the first end section of the venting conduit through its first open end in the noted manner at less than a certain flow rate. By disposing the entirety of each access port of the vent above this maximum liquid level, liquid being introduced into the first end section of the venting conduit through its first open in the noted manner end should not be able to gain access to the interior of the vent through its access port, and thereby should be precluded from flowing into the containment.

A number of characterizations may be made in relation to the first end section of the venting conduit, each of which is in accordance with the third aspect. In a first embodiment of the third aspect, the above-noted first end section of the venting conduit includes an upper wall, a lower wall, and a pair of sidewalls that are spaced from each other and that each extend between and interconnect the upper and lower walls. The lower wall includes an apex that is disposed at a higher elevation than the first open end of the first end section of the venting conduit. The vent includes an access port that is entirely disposed at a higher elevation than this apex of the lower wall.

In a second embodiment of the third aspect, an apex of a flow path through the above-noted first end section of the venting conduit is disposed at a higher elevation than the first open end of the first end section of the venting conduit. The vent includes an access port that is entirely disposed at a higher elevation than a lower boundary of the first end section of the venting conduit at the location of this flow path apex.

In a third embodiment of the third aspect, the first end section of the venting conduit is in the form of an elbow. This elbow is oriented such that the first open end projects downwardly. The elbow is defined at least in part by an outer or outside radius, as well as an inner or inside radius. The vent includes an access port that is entirely disposed at a higher elevation than the entirety of the elbow that is defined by the noted inner or inside radius.

In a fourth embodiment of the third aspect, the first end section of the venting conduit includes an interior surface, which in turn includes a first convex section. The vent includes an access port that is entirely disposed at a higher elevation than this first convex section.

In each of the noted first, second, third, and fourth embodiments of the third aspect, liquid that is introduced into the venting conduit through its first open end should start flowing back out of this first open end before the liquid level within the first end section of the venting conduit can rise to the level of any access port of the vent. If any of this liquid were to rise to the same or a higher level than any access port of the vent, this liquid could then enter the vent and ultimately the containment. Therefore, it would then be proper to characterize the vent of the first through the fourth embodiments of the third aspect as an anti-tampering device.

A fourth aspect of the present invention is embodied by a vent assembly. This vent assembly is fluidly interconnectable with a liquid reservoir of any appropriate type. The vent assembly includes an elbow having first and second elbow ends that are open. The elbow would be installed such that the second elbow end is located between the liquid reservoir and the first elbow end. A vent is at least partially disposed within elbow. One end of the vent is open, one end of the vent is closed, and a sidewall extends between these two ends of the vent. At least one aperture or access port for accessing the interior of the vent is included on the sidewall of the vent. The vent is oriented relative to the elbow such that its closed end is located between the first open end of the elbow and the open end of the vent. The various features discussed above in relation to the first end section or first section of the venting conduit and the vent, in any of the first through the third aspects, may be used by this fourth aspect as well, individually or in any combination.

DETAILED DESCRIPTION OF THE INVENTION

Figure 1:
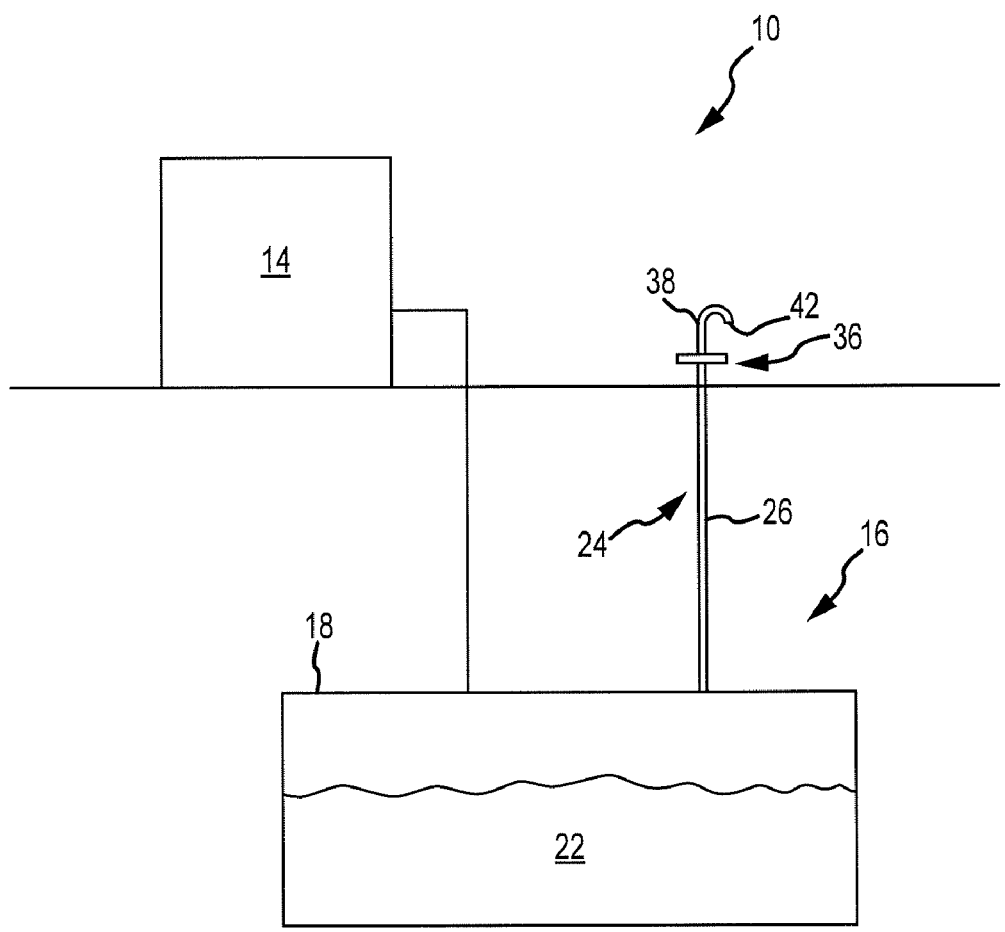
FIG. 1 is a schematic of one embodiment of a vented water supply system.

The present invention will now be described in relation to the accompanying drawings, which at least assist in illustrating its various pertinent features. FIG. 1 illustrates one embodiment of a water supply system 10. This water supply system 10 includes a water treatment plant 14 that is fluidly interconnected with a water storage system 16 in any appropriate manner. The water treatment plant 14 may be of any appropriate configuration, and may be disposed at any appropriate location relative to the water storage system 16. Water may be retrieved from the water storage system 16 through the water treatment plant 14 or in any other appropriate manner (e.g., a pump).

The water storage system 16 includes an appropriate containment 18 having a quantity of water 22 stored therein therein. The containment 18 may be of any appropriate size, shape, and/or configuration, and further may be formed from any appropriate material or combination of materials. In the illustrated embodiment, the containment 18 is disposed entirely underground, although such may not be the case in all instances. For instance, the containment 18 could be disposed entirely above ground, or one part of the containment 18 could be disposed underground and another part of the containment 18 could be disposed above ground. In the illustrated embodiment, water 22 is stored within the containment 18. The venting system to be described in relation to the water storage system 16 may be appropriate for use with liquids other than water.

The water storage system 16 also includes a venting conduit 24 that extends from the containment 18, typically to a location above the ground. In the illustrated embodiment, this venting conduit 24 is in the form of a riser pipe 26 and a separate elbow 38 that are appropriately interconnected by a flange assembly 36. Both the riser pipe 26 and elbow 38 may be of any appropriate size, shape, and configuration, and further may be formed from any material or combination of materials. One end of the riser pipe 26 is fluidly interconnected with the containment 18, while its opposite end will typically be located above ground. The elbow 38 is interconnected with this opposite end of the riser pipe 26 by the flange assembly 36 in the illustrated embodiment, although any appropriate way of interconnecting the elbow 38 with the riser pipe 26 may be utilized. What is of importance is that the venting conduit 24 extend from the containment 18 and that it terminate at an open end 42. In the illustrated embodiment, the open end 42 of the venting conduit 24 is incorporated on an end of the elbow 38.

The open end 42 of the venting conduit 24 may be of any appropriate configuration that allows a flow therethrough in either direction. That is, the open end 42 should allow air to be exhausted from the containment 18 while supplying water 22 thereto. The open end 42 should also allow air to be drawn into the containment 18 while withdrawing water 22 therefrom. In one embodiment, a screen or the like is mounted on or otherwise incorporated at the open end 42.

Figure 2:
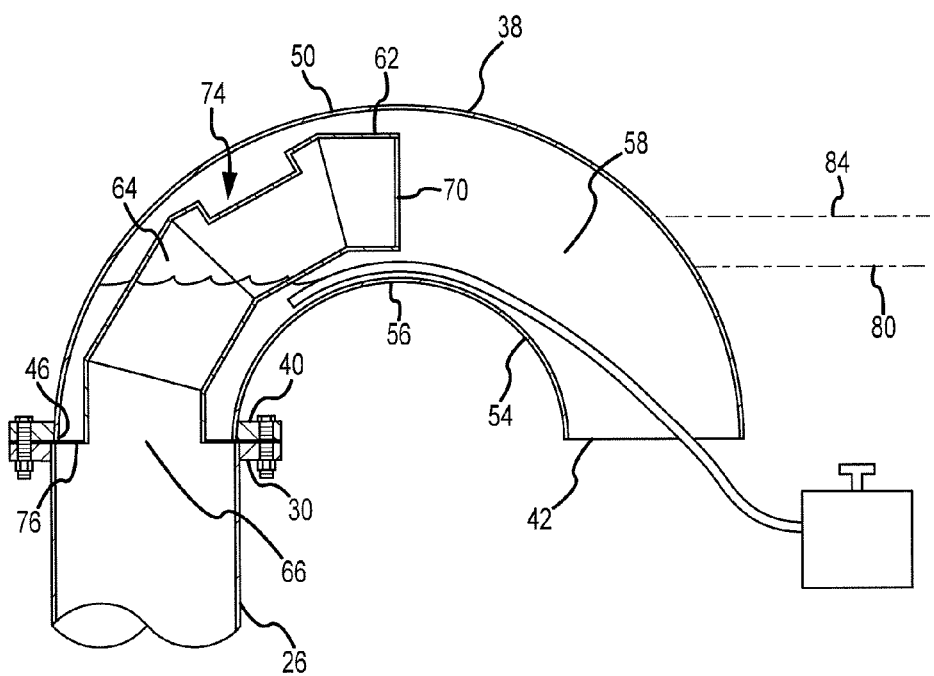
FIG. 2 is a cutaway view of an internal anti-tampering vent that may be used by the vented water supply system of FIG. 1.
Figure 3:
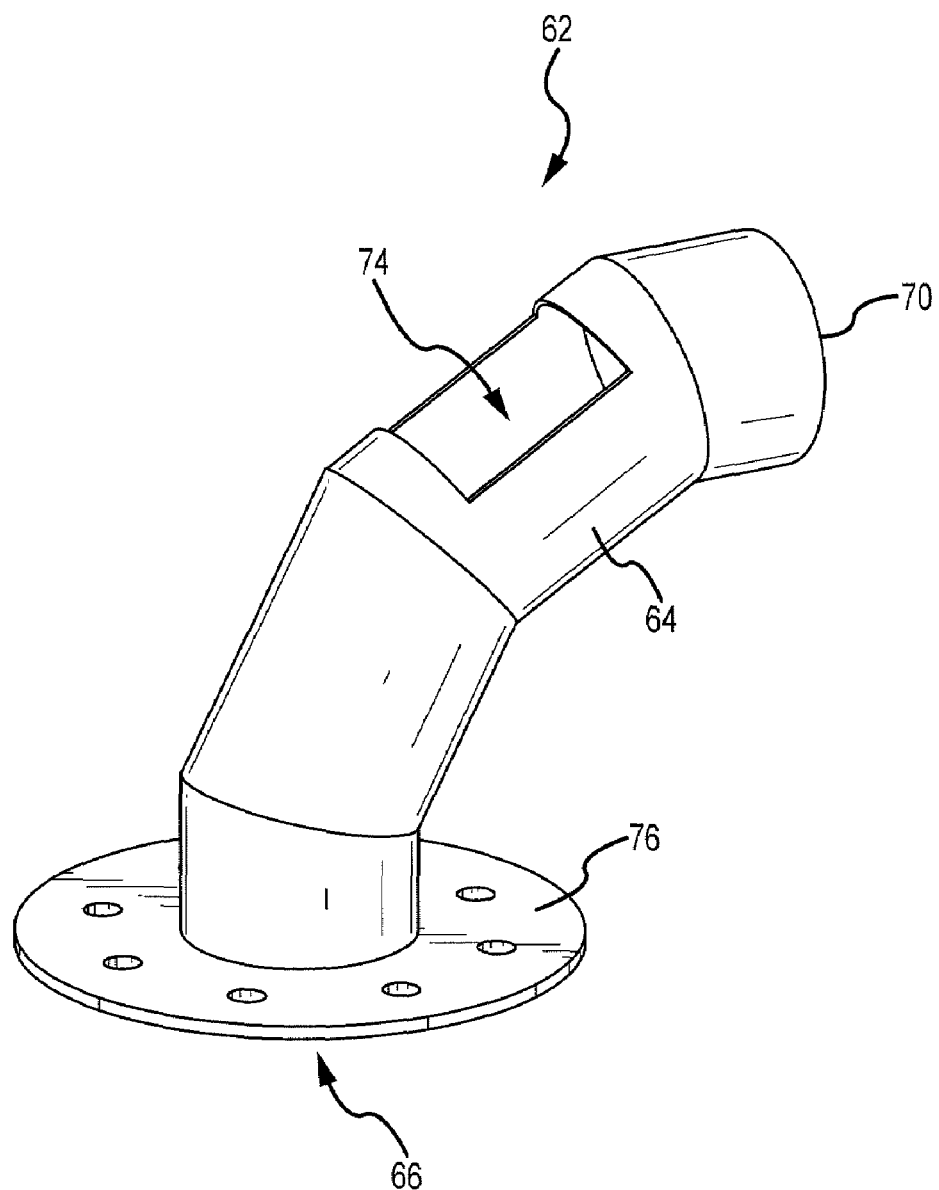
FIG. 3 is a perspective view of the internal anti-tampering vent illustrated in FIG. 2.

A vent 62 is disposed within the elbow 38 of the venting conduit 24, and is configured/arranged relative to the elbow 38 so that the potential is reduced for being able to introduce a liquid into the open end 42 of the elbow 38 at less than a certain flow rate and have this liquid reach the containment 18. The vent 62 may therefore be characterized as an anti-tampering device of sorts. Various details of the vent 62 and its interrelationship with the elbow 38 that provide this basic function are illustrated in FIG. 2. A perspective view of the vent 62 is provided in FIG. 3.

The elbow 38 is of the 180° type, and is oriented such that its open end 42 projects toward the ground in the installed position. An opposite open end 46 of the elbow 38 is also open, interfaces with, or is at least proximate to an elbow flange 40, and also projects toward the ground. This elbow flange 40 is part of the above-noted flange assembly 36 that interconnects the elbow 38 with the riser pipe 26. In the illustrated embodiment, the elbow 38 is symmetrical, although such need not always be the case. Moreover, although the two open ends 42, 46 of the elbow 38 are disposed at the same elevation in the illustrated embodiment, such need not always be the case.

The elbow 38 may be characterized as including an upper wall 50, a lower wall 54 that is vertically spaced from the upper wall 50, and a pair of sidewalls 58 that extend between and structurally interconnect the upper wall 50 and lower wall 54 (only one shown in FIG. 2). These separate sections are identified for the elbow 38 to facilitate the description of the position of the vent 62 therewithin, more specifically to facilitate the description of the position of an access port 74 of the vent 62—not as an indication that the elbow 38 is required to be formed from four separate pieces. The elbow 38 may be formed in any appropriate manner (e.g., of one-piece construction), may be formed from any appropriate material or combination of materials, may be of any appropriate size, and may define a flow path of any appropriate cross-sectional configuration (e.g., circular).

The lower wall 54 of the elbow 38 may be characterized as being defined by an inner or inside radius, while the upper wall 50 of the elbow 38 may be characterized as being defined by an outer or outside radius. The lower wall 54 may also be characterized as being at least generally convex on its interior, and as having a crest, crown, or apex 56. This apex 56 is the portion of the lower wall 54 that is the lower boundary of the apex of a flow path through the elbow 38. Both open ends 42, 46 of the elbow 38 are disposed at a lower elevation than the apex 56 of the lower wall 54. At least the open end 42 of the elbow 38 should be disposed at a lower elevation than the apex 56. Notably, each access port 74 is entirely disposed at a higher elevation than the apex 56.

In the illustrated embodiment, the apex 56 of the lower wall 54 of the elbow 38 is disposed at an elevation corresponding with a reference plane 80. Reference plane 80 also defines what may be characterized as the "maximum liquid level" within the elbow 38 when attempting to introduce a liquid into the elbow 38 through its open end 42 at less than a certain flow rate. Generally, when liquid being introduced into the elbow 38 in this manner reaches the elevation illustrated by the reference plane 80, the liquid will start flowing out of the elbow 38 through its open end 42. Because the entirety of an access port 74 of the vent 62 is disposed at a higher elevation (the minimum elevation of the access port 74 being represented by a reference plane 84) than the elevation of the apex 56 of the lower wall 54 (represented by reference plane 80), liquid being introduced into the elbow 38 in this manner (again, at less than a certain flow rate) should not be able to progress into the vent 62 and then to the containment 18.

The vent 62 includes a vent end 70 that is closed (hereafter a closed vent end 70) in any appropriate manner, another vent end 66 that is open (hereafter an open vent end 66), a sidewall 64 that extends between the closed vent end 70 and the open vent end 66, and an access port 74 that extends through the sidewall 64. The open vent end 66 interfaces with or is at least generally proximate to a vent flange 76 that may be incorporated into the flange assembly 36. Once again, the flange assembly 36 interconnects the riser pipe 26 and the elbow 38. Generally, the access port 74 is located between the closed vent end 70 and the open vent end 66. When the vent 62 is installed, the closed vent end 70 is located between the open end 42 of the elbow 38 (more generally the distal, open end 42 of the venting conduit 24) and the open vent end 66 (that leads into the riser pipe 26). The access port 74 may be of any appropriate size, shape, and configuration. Multiple access ports 74 could be used as well. In one embodiment, the cross-sectional area of the access port 74 (e.g., the open area of the access port 74) is at least generally about the same as the cross-sectional area of the flow path through the riser pipe 26 (e.g., the area of a cross-section of this flow path, taken perpendicularly to the direction of the flow). In any case, there is an "always open" path for fluid communication (liquid and/or gas) between the interior of the containment 18 and the space into which the open end 42 of the elbow 38 discharges.

The access port 74 of the vent 62 is located within the elbow 38 in order to reduce the potential of being able to introduce a liquid into the open end 42 of the elbow 38 in a manner such it flows into the riser pipe 26, and ultimately into the containment 18. One characterization of this location is that the entirety of each access port 74 of the vent 62 is disposed at a higher elevation than the apex 56 of the lower wall 54. Reference plane 80 again coincides with the elevation of the apex 56 of the lower wall 54 of the elbow 38, while reference plane 84 corresponds with the minimum elevation of the access port 74 of the vent 62 (i.e., other portions of the access port 74 may be disposed at even a higher elevation).

Another characterization of the location of each access port 74 of the vent 62 is that the entirety of each access port 74 is disposed at a higher elevation than any portion of the elbow 38 that is defined by its inner radius (the lower wall 54 in the illustrated embodiment). Yet another characterization is that there is an apex of a flow path through the elbow 38, and that the entirety of each access port 74 of the vent 62 is disposed at a higher elevation than a lower boundary of the elbow 38 at this flow path apex (e.g., corresponding with the apex 56 of the lower wall 54). Yet another characterization is that the interior of the elbow 38 includes a convex surface (e.g., the apex 56 of the lower wall 54), and that the entirety of each access port 74 of the vent 62 is disposed at a higher elevation than this convex surface.

As noted above, a flange assembly 36 interconnects the riser pipe 26 and the elbow 38. Any appropriate way of interconnecting the riser pipe 26, vent 62, and elbow 38 may be utilized. In the illustrated embodiment, a riser pipe flange 30 and the riser pipe 26 are appropriately attached together (e.g., the riser pipe flange 30 may be welded to the riser pipe 26; the riser pipe flange 30 could be integrally formed with the riser pipe 26), while a vent flange 76 and the vent 62 are appropriately attached together as well (e.g., the vent flange 76 could be separately attached to the vent 62; the vent flange 76 and the vent 62 may be of one-piece construction (e.g., a molded part)). In any case, the vent 62 extends within the elbow 38 such that the closed end 70 of the vent 62 is located between the open end 42 of the elbow 38 and the open end 66 of the vent 62. Generally, the vent flange 76 is sandwiched somewhere between the elbow flange 40 (which is appropriately attached to the elbow 38, such as by welding or by being integrally formed therewith) and the riser pipe flange 30. The riser pipe flange 30, the vent flange 76, and the elbow flange 40 collectively define the noted flange assembly 36, and are appropriately secured together. A plurality of bolts or other suitable fasteners may be used to place the flange assembly 36 in compression. One or more intermediate flanges could be used between the elbow flange 40 and the vent flange 76, between the vent flange 76 and the riser pipe flange 30 (e.g., a reducing flange), or both. However and as noted above, any appropriate way of interconnecting the elbow 38, vent 62, and riser pipe 26 in the general noted arrangement may be utilized.

The manner in which the elbow 38, vent 62, and riser pipe 26 are interconnected define a flow obstruction in the venting conduit 24 that is in effect bypassed by the vent 62. In the illustrated embodiment, this flow obstruction is defined by that portion of the vent flange 76 that is disposed within that portion of the flow path between the exterior surface of the vent 62 and the interior surface of the elbow 38. Any appropriate way of defining such a flow obstruction that can be bypassed only through the vent 62 may be utilized. That is, the only way that a liquid may be introduced into the open end 42 of the elbow 38 and reach the riser pipe 26 and ultimately the containment 18, is for this fluid to bypass the flow obstruction by passing through the access port 74 of the vent 62. Liquid that enters the access port 74 will of course flow into the interior of the vent 62, into the riser pipe 26, and ultimately into the containment 18. However and as noted above, the access port 74 is located in a manner that reduces the potential of a liquid being able to enter the vent 62 in this manner, at least under lower flow rate conditions.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A water storage system, comprising:
   a containment;
   water within said containment;
   a venting conduit extending from said containment and comprising a first open end; and
   a vent disposed within said venting conduit and fluidly interconnected with said containment, wherein said venting conduit comprises a first end section that in turn comprises said first open end, wherein said first end section comprises an upper wall, a lower wall, and a pair of sidewalls, wherein said lower wall comprises an apex that is disposed at a higher elevation than said first open end of said venting conduit, and wherein said vent comprises an access port that is disposed at a higher elevation than said apex, wherein a constantly open flow path is maintained between said first open end of said venting conduit and said containment and comprises said access port of said vent.

2. The water storage system of claim 1, wherein said containment is an underground water storage reservoir.

3. The water storage system of claim 1, wherein all flow between said first open end of said venting conduit and said containment must pass through said vent, regardless of a direction of a flow through said venting conduit.

4. The water storage system of claim 1, wherein a flow entering said first open end of said venting conduit needs to enter said vent through said access port before being able to proceed into said containment.

5. The water storage system of claim 1, wherein said vent comprises means for reducing a potential for introducing a liquid into said containment through said first open end of said venting conduit.

6. The water storage system claim 1, wherein said first open end of said venting conduit is located above ground and projects at least generally downwardly.

7. The water storage system of claim 1, wherein said vent comprises a first vent end that is closed, a second vent end that is open, and a sidewall extending between said first vent end and said second vent end, wherein said access port of said vent extends through said sidewall at a location between said first vent end and said second vent end, and wherein said vent is oriented relative to said venting conduit such that said first vent end is located between said first open end of said venting conduit and said second vent end.

8. The water storage system of claim 7, wherein a reference plane that bisects said first end section of said venting conduit and that extends through said apex defines first and second sides of said first end section, wherein said first open end of said venting conduit is located entirely on said first side of said first end section, and wherein said access port of said vent is located within said first end section entirely on said second side of said first end section.

9. The water storage system of claim 7, wherein said first open end of said venting conduit is on a first side of said apex, and wherein an entirety of said access port of said vent is on a second side of said apex that is opposite of said first side.

10. The water storage system claim 1, wherein said first end section of said venting conduit is an elbow that thereby includes said first open end, wherein said first open end projects downwardly, wherein said elbow comprises an outer radius and an inner radius, and wherein said access port of said vent is disposed at a higher elevation than an entirety of said elbow that is defined by said inner radius.

11. The water storage system of claim 1, wherein said venting conduit comprises a riser pipe, a riser pipe flange attached to said riser pipe, an elbow that includes said first open end, and an elbow flange attached to said elbow, wherein said first end section of said venting conduit is said elbow, wherein said water storage system further comprises a vent flange attached to said vent, wherein said vent flange is located somewhere between said riser pipe flange and said elbow flange such that said vent extends within said elbow, and wherein said vent flange obstructs a flow from said elbow directly into said riser pipe.

12. The water storage system of claim 1, further comprising a flow obstruction within said venting conduit, wherein said vent bypasses said flow obstruction.

13. A water storage system, comprising:
- a containment;
- water within said containment;
- a venting conduit that extends from said containment and that comprises a first open end, wherein said venting conduit comprises a riser pipe, a riser pipe flange attached to said riser pipe, an elbow that includes said first open end, and an elbow flange attached to said elbow;
- a flow obstruction within said venting conduit, wherein a first section of said venting conduit is on a first side of said flow obstruction and comprises said first open end, wherein a second section of said venting conduit is on a second side of said flow obstruction that is opposite said first side, and wherein said second section of said venting conduit extends from said flow obstruction to said containment;
- a vent disposed within said venting conduit and that bypasses said flow obstruction to allow fluid communication between said first and second sections of said venting conduit; and
- a vent flange attached to said vent, wherein said vent flange is disposed somewhere between said riser pipe flange and said elbow flange such that said vent extends within said elbow, wherein said vent comprises an access port, wherein said vent flange obstructs a flow from said elbow directly into said riser pipe and thereby comprises said flow obstruction, and wherein said riser piper comprises said second section of said conduit, and wherein said elbow comprises said first section of said venting conduit.

14. The water storage system of claim 13, wherein said containment is an underground water storage reservoir.

15. The water storage system of claim 13, wherein all flow between said first open end of said venting conduit and said containment must pass through said vent, regardless of a direction of flow through said venting conduit.

16. The water storage system of claim 13, wherein a flow entering said first open end of said venting conduit needs to enter said vent before being able to proceed into said containment.

17. The water storage system of claim 13, further comprising means for reducing a potential for introducing a liquid into said containment through said first open end of said venting conduit, wherein said means for reducing comprises said flow obstruction and said vent.

18. The water storage system of claim 13, wherein said vent comprises a first vent end that is closed, a second vent end that is open, and a sidewall extending between said first vent end and said second vent end, wherein said access port of said vent extends through said sidewall at a location between said first vent end and said second vent end, and wherein said vent is oriented relative to said venting conduit such that said first vent end is located between said first open end of said venting conduit and said second vent end.

19. The water storage system of claim 13, wherein said first section of said venting conduit comprises an upper wall, a lower wall, and a pair of sidewalls, wherein said lower wall comprises an apex that is disposed at a higher elevation than said first open end, and wherein said access port of said vent is disposed at a higher elevation than said apex.

20. The water storage system of claim 19, wherein said vent comprises a first vent end that is closed and a second vent end that is open, wherein said first vent end is located between said first open end of said first section of said venting conduit and said second vent end, wherein said second vent end is fluidly interconnected with said second section of said venting conduit, and wherein said access port is disposed between said first vent end and said second vent end.

21. The water storage system of claim 20, wherein a flow entering said first open end of said first section of said venting conduit needs to enter said vent through said access port before being able to proceed to said containment through said second section of said venting conduit.

22. The water storage system of claim 13, wherein an apex of a flow path through said first section of said venting conduit is disposed at a higher elevation than said first open end, and wherein said access port of said vent is disposed at a higher elevation than a lower boundary of said first section of said venting conduit at said apex of said flow path.

23. The water storage system claim 13, wherein said first open end projects downwardly, wherein said elbow comprises an outer radius and an inner radius, and wherein said access port of said vent is disposed at a higher elevation than an entirety of a wall of said elbow that is defined by said inner radius.

24. The water storage system claim 13, wherein said first section of said venting conduit comprises an interior surface, that in turn comprises a first convex section, and wherein said access port of said vent is disposed at a higher elevation than an apex of said first convex section.

25. A water storage system, comprising:
- a containment;
- water within said containment;
- a venting conduit extending from said containment and comprising a first open end; and
- a vent disposed within said venting conduit and fluidly interconnected with said containment, wherein said vent comprises a first vent end that is closed, a second vent end that is open, a sidewall extending between said first vent end and said second vent end, and an access port that extends through said sidewall at a location between said first vent end and said second vent end, and wherein said vent is oriented relative to said venting conduit such that said first vent end is located between said first open end of said venting conduit and said second vent end.

26. A vent assembly fluidly interconnectable with a liquid reservoir, comprising:
- an elbow comprising first and second elbow ends that are open, wherein said elbow is installed such that said second elbow end is located between the liquid reservoir and said first elbow end; and
- a vent that is at least partially disposed within said elbow, wherein said vent comprises a first vent end that is closed, a second vent end that is open, a vent sidewall extending between said first vent end and said second vent end, and an access port extending through said vent sidewall, wherein said first vent end is located within said elbow between said first elbow end and said second vent end, and wherein said access port is disposed between said first vent end and said second vent end.

27. The vent assembly of claim 26, wherein said elbow comprises an upper wall, a lower wall, and a pair of sidewalls, wherein said lower wall comprises an apex that is disposed at a higher elevation than said first and second elbow ends when said first and second elbow ends are directed downwardly, and wherein said access port is disposed at a higher elevation than said apex.

28. The vent assembly of claim 26, wherein said elbow comprises an outer radius and an inner radius, and wherein said access port is disposed at a higher elevation than a wall of said elbow that is defined by said inner radius when said first and second elbow ends are directed downwardly.

29. The vent assembly of claim 26, wherein said elbow comprises an interior surface, that in turn comprises a first convex section, and wherein said access port is disposed at a higher elevation than an apex of said first convex section when said first and second elbow ends are directed downwardly.

30. The vent assembly of claim 26, further comprising an elbow flange mounted on said elbow, and a vent flange mounted on said vent, wherein said vent is directed through said second elbow end to dispose said elbow flange and said vent flange in abutting relation.

* * * * *